United States Patent [19]

Matsuki et al.

[11] Patent Number: 5,006,798
[45] Date of Patent: Apr. 9, 1991

[54] POSITION DETECTION USING RELUCTANCE CHANGES INDUCED BY DISPLACEMENT OF METALLIC BALLS

[75] Inventors: Yuji Matsuki, Sayama; Wataru Ichikawa, Tokyo, both of Japan

[73] Assignee: Kabushiki Kaisha SG, Tokyo, Japan

[21] Appl. No.: 476,799

[22] Filed: Feb. 8, 1990

[30] Foreign Application Priority Data

Feb. 9, 1989 [JP] Japan .................... 1-13555[U]

[51] Int. Cl.$^5$ .................... G01B 7/14; G01R 33/00
[52] U.S. Cl. .................... 324/207.17; 324/207.24; 324/262
[58] Field of Search .................... 324/207.17, 207.22, 324/207.24, 226, 262

[56] References Cited

U.S. PATENT DOCUMENTS 4,103,222 7/1978 Phillips et al. ................. 324/207.22
4,556,886 12/1985 Shimizu et al. ................. 340/870.32

*Primary Examiner*—Walter E. Snow
*Attorney, Agent, or Firm*—Spensley Horn Jubas & Lubitz

[57] ABSTRACT

A linear guide includes a linear guide member provided over a guide range, a movable member being displaceable along the linear guide member and a ball bearing assembly provided on the movable member in a portion which comes in sliding contact with the linear guide member. A position detection device for the linear guide comprises the ball bearing assembly and a coil assembly and the ball bearing assembly has a casing and a succession of plural metallic balls disposed within the casing to form an endless ball array with each adjacent one of the balls being in close contact with another whereby the balls are linearly displaceable in accordance with displacement of the movable member. The coil assembly is provided on a part of the casing and includes a coil member which is excited by an ac signal. A magnetic path is formed through the ball located at the part of the casing and a reluctance change is produced in the magnetic path in accordance with displacement of the balls. One cycle of the reluctance change is determined by displacement corresponding to the diameter of the balls. An output signal responsive to the reluctance change is produced from the coil assembly.

7 Claims, 4 Drawing Sheets

POSITION DETECTION USING RELUCTANCE CHANGES INDUCED BY DISPLACEMENT OF METALLIC BALLS

BACKGROUND OF THE INVENTION

This invention relates to a variable reluctance, phase shift type position detection device and, more particularly, to a position detection device of this type capable of applicable, with a simple structure, to a linear guide mechanism such as a ball screw or a ball guide using ball bearings as their bearings.

A variable reluctance, phase shift type linear position detection device is disclosed in U.S. Pat. No. 4,556,886. The position detection device disclosed in this patent includes primary coils disposed in predetermined locations which are shifted in the direction of displacement, secondary coils provided in correspondence to these primary coils and a core section having cores disposed relatively displaceably to the secondary coils and with a predetermined interval in the direction of displacement. The respective primary coils are individually excited by reference ac signals which are shifted in phase from one another whereby output signals which are the reference ac signals phase-shifted in accordance with the position of the core section relative to the primary coils are produced from the primary coils.

If the above described linear position detection device is used for a linear guide mechanism such as a ball screw or a ball guide having ball bearings as their bearings, it is necessary to provide, in addition to the linear guide, a core section including a plurality of cores extending in parallel with the linear guide. This requires a considerable extra space with resulting difficulty in achieving a compact design and resulting complex structure and high manufacturing cost.

SUMMARY OF THE INVENTION

It is, therefore, an object of the invention to provide a position detection device capable of detecting a position of a linear guide without the necessity for the provision of an exclusively used core section parallel with the linear guide.

For achieving the above object, the position detection device for a linear guide according to the invention wherein the linear guide includes a linear guide member provided over a guide range, a movable member being displaceable along the linear guide member and a ball bearing assembly provided on the movable member in a portion which comes in sliding contact with the linear guide member is characterized in that the ball bearing assembly has a casing and a succession of plural metallic balls disposed within the casing to form an endless ball array with each adjacent one of the balls being in close contact with another so that the balls are linearly displaceable in accordance with displacement of the movable member and that the position detection device comprises a coil asembly provided on a part of the casing and including a coil member to be excited by an ac signal so that a magnetic path is formed through the ball located at the part of the casing and a reluctance change is produced in the magnetic path in accordance with displacement of the balls, one cycle of the reluctance change being determined by displacement corresponding to the diameter of the balls, and the coil assembly producing an output signal responsive to the reluctance change.

As the movable member dispaces along the linear guide member, the ball bearing assembly provided on the movable member comes in sliding contact with the linear guide member and the balls made of magnetic substance disposed within the casing in close contact with each other roll with the sliding movement. The succession of the metallic balls disposed in the casing form the endless ball array where each adjacent one of the balls in close contact with another whereby the balls are linearly displaceable in accordance with displacement of the movable member. In the coil assembly provided on a part of the casing, reluctance change whose one cycle is determined by displacement substantially corresponding to the diameter of the balls is produced in accordance with the displacement of the movable member and an output signal corresponding to this reluctance change is produced. The position of the movable member can be detected by this output signal.

In a case, for instance, the movable member is displaced by 1 cm along the linear guide member, the balls within the casing move by 1 cm along the linear guide member. The position of the movable member can be detected by detecting this displacement of the balls.

Since the balls in the ball bearing assembly are linearly displaceable in accordance with the displacement of the movable member and the displacement of the balls is detected by the coil assembly provided on a part of the casing, the position of the linear guide can be detected without the necessity of the parallel provision of the exclusive core section.

Embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
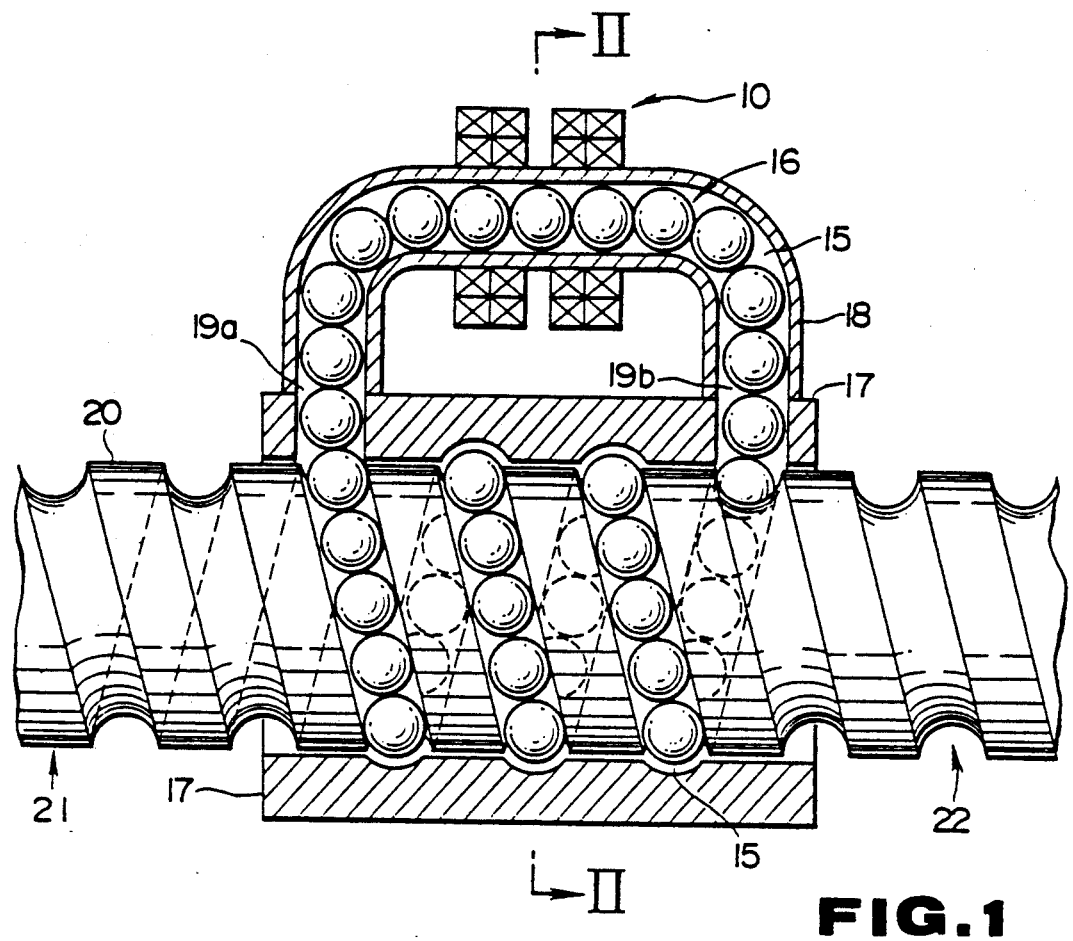
FIG. 1 is a side view, partically in section, of an embodiment of the position detection device for a linear guide according to the invention.

Referring to FIG. 1, the linear guide mechanism consists of a ball screw mechanism using a ball bearing. As bearing balls, balls 16 made of magnetic substance are used. A screw 20 is a male-screw having a groove 22 with a predetermined pitch. The screw 20 is driven and rotated by an unillustrated power unit.

Figure 3:
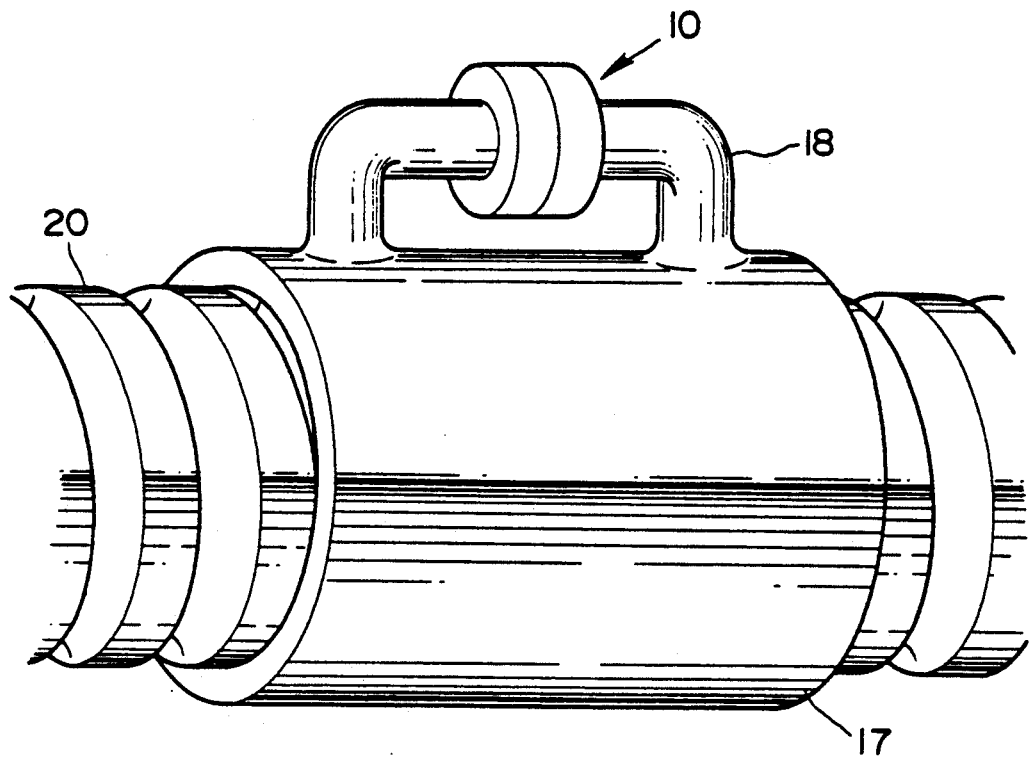
FIG. 3 is a perspective view of appearance of this embodiment.

A slide section 17 is, as shown in FIG. 3, of a cylindrical shape and is mounted on the screw 20 in a manner to enclose the screw 20 over a predetermined range and displaces linearly in accordance with rotation of the screw 20. The inner peripheral portion of the slide section 17 is in rotatable engagement with a thread 21 of the screw 20 and is formed with a groove for receiving the magnetic balls 16 with a pitch corresponding to the screw groove 22. This ball receiving groove is opened in both end portions of the slide section 17 and a casing pipe 18 is connected at ends thereof to the opening portion of the ball receiving groove. In other words, the slide section 17 constitutes a part of the casing 15 receiving the magnetic balls 16 in association with the thread 21 and the groove 22.

The casing pipe 18 is of a tubular configuration having an inner diameter which is approximately the same as the diameter of the balls 16 and is made of non-magnetic substance. Both ends of the casing pipe 18 are connected to the end portions of the slide section 17. The magnetic balls 16 are rotatably and displaceably received in close contact with each adjacent one of the magnetic balls 16 in the casing pipe 18 also, that is, the casing pipe 18 constitutes the casing 15 together with the receiving section consisting of the slide section 17 and the screw 20 respectively receiving the magnetic balls 16. Accordingly, the magnetic balls 16 are rotatably and displaceably received in close contact with each adjacent one of the magnetic balls 16 in the casing 15 thereby forming an endless ball array. The magnetic balls 16 of course function as a ball bearing.

The magnetic balls 16 within the casing 15 circulate endlessly in response to rotation of the screw 20 from one end or the other end of the opening portion of the slide section 17 into the casing pipe 18 or from the casing 18 to one opening portion or the other opening portion of the slide section 17. The amount of displacement of each magnetic ball 16 is proportional to the amount of rotation of the screw 20 and the amount of rotation of the screw 20 in turn is proportional to the amount of linear displacement of the slide section 17. The amount of displacement of the magnetic balls 16 therefore corresponds to the amount of linear displacement of the slide section 17 so that the linear position of the slide section 17 can be detected by detecting the amount of displacement of the magnetic balls 16.

Assume, for example, that the screw 20 has been rotated by a certain angle and one of the magnetic balls 16 has been fed from the opening portion of the slide section 17 to a port 19b of the casing pipe 18. This causes one of the magnetic balls 16 to be fed from a port 19a from within the casing pipe 18 into the slide section 17. Thus, one magnetic ball 16 is fed from the port 19a of the casing pipe 18 into one end of the opening portion of the slide section 17 and one magnetic ball 16 is fed in a circulating motion from one end to the other end of the slide section 17. If the direction of rotation of the screw 20 is reversed, the direction of circulation of the magnetic balls 16 will be also reversed.

Figure 2:
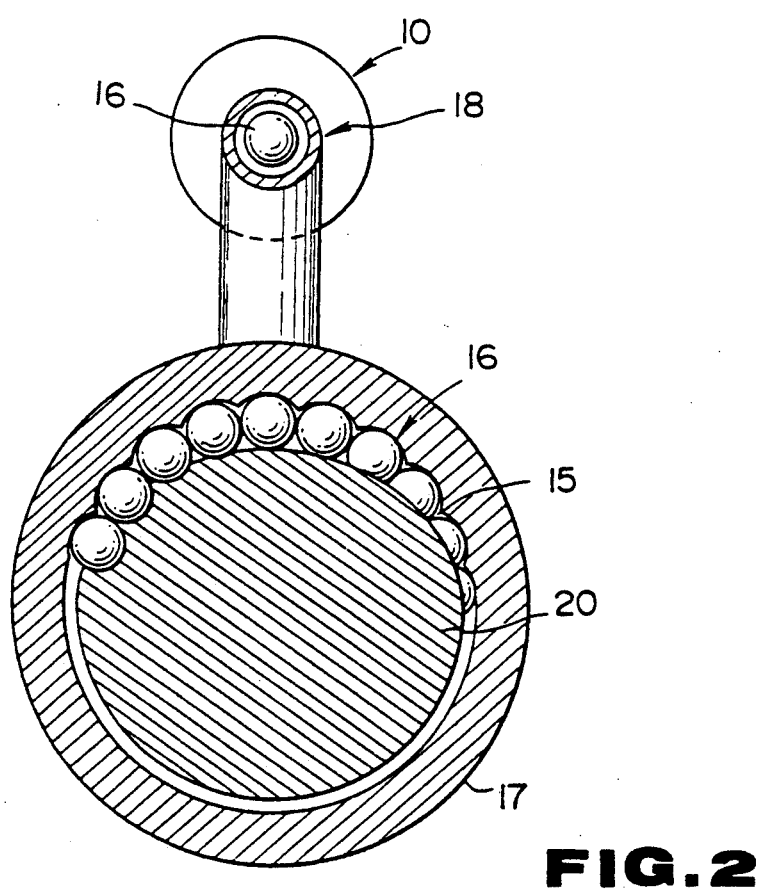
FIG. 2 is a sectional view taken along arrows II—II in FIG. 1.
Figure 4:
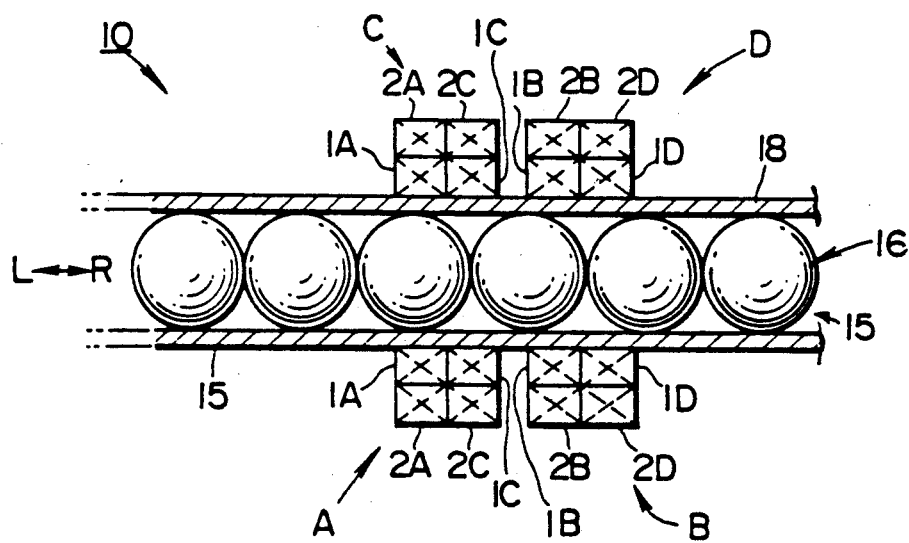
FIG. 4 is a sectional view of the coil assembly in FIG. 1.

FIG. 2 is a sectional view of this ball screw mechanism taken along the arrows II—II in FIG. 1. A coil section 10 for detecting a position is attached to a certain portion of the casing pipe 18. The coil assembly 10 includes primary coils disposed in a manner to enclose the outer perphery of the casing pipe 18 and secondary coils disposed in correspondence to these primary coils. FIG. 4 is a sectional view of the coil section 10 and the casing pipe 18. There are provided four primary coils 1A-1D, secondary coils 2A-2D and the magnetic balls 16 which are disposed in a coil space defined by these coils and displaces in the casing 15 in a direction of an arrow R or L. Thus, output signals generated in the secondary coils 2A-2D are taken out by the magnetic balls 16 which circulate within the casing 15 and displace relatively to the coil section 12 and the position of the slide section 17 is detected on the basis of the amount of displacement of the magnetic balls 16. If, for example, the primary coils are excited in two phases by sine wave signals and cosine wave signals, the phase of secondary output ac signals corresponds to the linear displacement and, accordingly, the linear position can be detected by measuring the phase of these secondary output ac signals. A position detection device using such phase shift system is disclosed in U.S. Pat. No. 4,556,886 and its basic principle will be briefly explained below.

If the diameter of the magnetic ball 16 is designated by "P" (P being any value), the interval between respective centers of adjacent magnetic balls 16 is also "P" so that the pitch of central interval of the magnetic balls 16 is "P". The coils are provided such that they operate in four phases. Phases of pairing coils 1A, 2A; 1B, 2B; 1C, 2C; and 1D, 2D are distinguished from one another by reference characters A through D. There is difference of 90 degrees in reluctance produced in the respective phases A-D so that if, for example, the phase A is a positive cosine phase, the phase B becomes a positive sine phase, the phase C a negative cosine phase and the phase D a negative sine phase. For each of the phases A-D, each corresponding one of the primary coils 1A-1D and the secondary coils 2A-2D is individually provided. The secondary coils 2A-2D corresponding to the respective phases A-D are wound on the outside of their corresponding primary coils 1A-1D. The length of each coil is approximately equal to the radius of the magnetic ball 16 which is "P/2". The coils 1A and 2A of the phase A and the coils 1C and 2C of the phase C which are of opposite phase to each other are provided adjacent to each other. Similarly, the coils 1B and 2B of the phase B and the coils 1D and 2D of the phase D which are of opposite phase to each other are provided adjacent to each other. The interval between the coils of opposite phase is generally "P×(n + ½)" (n being any natural number). The interval between the centers of the coils of the phase A and the phase B or those of the coils of the phase C and the phase D which phases are different by 90 degrees is "P× (n±¼)" (n being any natural number).

In the above described structure, reluctance of the magnetic circuit in the respective phases A-D changes in accordance with the displacement of the magnetic balls 16 in the casing 15 and the phase of the reluctance change differs by 90 degrees between each phase (i.e., 180 degrees between the phase A and the phase C and also between the phase B and the phase D). The primary coils 1A and 1C for the phases A and C are excited in opposite phase to each other by a sine wave signal sin t and the outputs of the secondary coils 2A and 2C are added together in the same phase whereby a sine phase output which has been differentially made accurate is obtained. Similarly for the phases B and D, the primary coils 1B and 1D are excited in opposite phase by a cosine wave signal cos t and the outputs of the secondary coils 2B and 2D are added together in the same phase whereby a cosine phase output which has been differentially made accurate is obtained. The outputs of the respective secondary coils 2A-2D are added together to form an output signal Y. This output signal Y is equivalent to a signal obtained by phase shifting a reference ac signal (sin ω t or cos ωt) by a phase angle Φ in accordance with the displacement of the magnetic balls 16.

If, for example, the phase corresponding to the linear position of a certain magnetic ball 16 is Φ, the function of reluctance change corresponding to the position can be expressed by a formula in which the phase A is designated by cos Φ, the phase B by sin Φ, the phase C by −cos Φ and the phase D by −sin Φ. As a result, the output signal Y of the secondary coils 2A-2D synthesized by addition can be expressed by the following formula:

$$Y = \sin\omega t \times \cos\phi - (-\sin\omega t \times \cos\phi) +$$
$$\cos\omega t \times \sin\phi - (-\cos\omega t \times \sin\phi)$$
$$= 2\sin\omega t \times \cos\phi + 2\cos\omega t \times \sin\phi$$
$$= 2\sin(\omega t + \phi)$$

If the figure which has been expressed as "2" for the sake of convenience is replaced by a constant K which is determined by various conditions, Y can be expressed as $Y = K \sin(\omega t + \phi)$. In other words, since the phase $\phi$ of the reluctance change is proportional to the linear position Lx of the magnetic ball 16 in accordance with a predetermined proportion coefficient (or function), the position Lx can be detected by measuring the phase difference from the reference ac signal (sin ω t or cos ω t) in the output signal Y. When the amount of phase difference $\phi$ is the whole angle 2 π, the position Lx corresponds to the above described distance P. That is, the absolute position Lx within the distance P can be detected by the electrical phase difference amount $\phi$. In this manner, the position of the slide section 17 can be obtained by detecting the amount of the magnetic ball 16.

Figure 5:
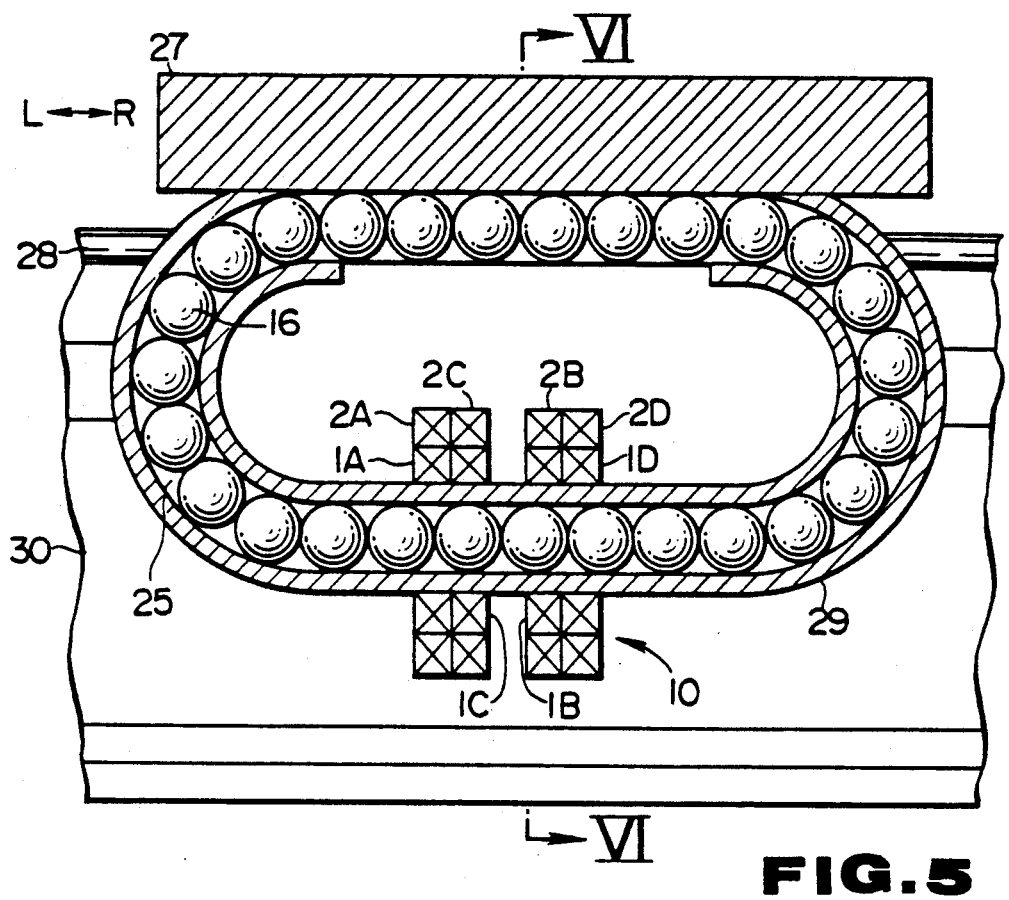
FIG. 5 is a side view, partly in section, of another embodiment of the position detection device according to the invention.
Figure 6:
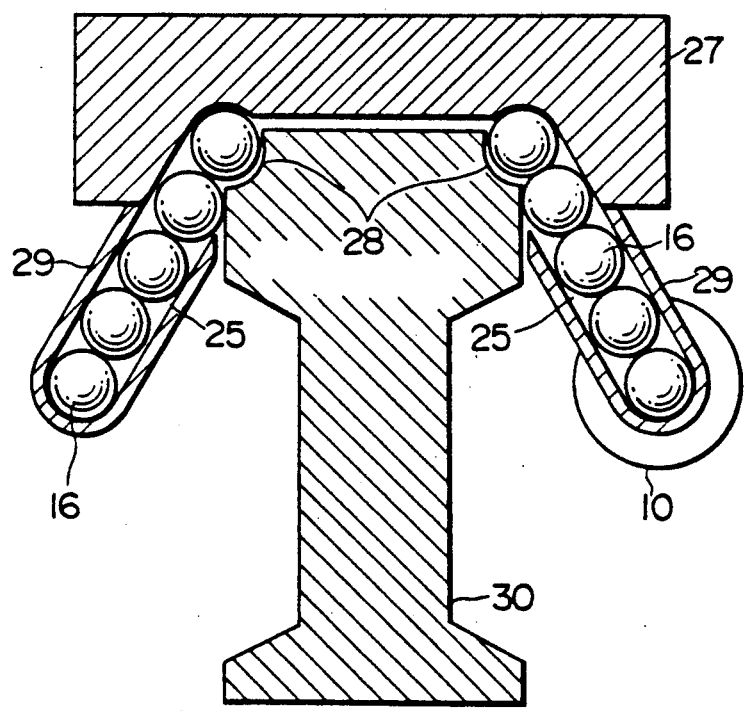
FIG. 6 a sectional view taken along arrows VI—VI in FIG. 5.

FIG. 5 shows another embodiment of the position detection device according to the invention in which a ball guide is used as the linear guide mechanism. In the figure, the component parts designated by the same reference characters as those used in FIG. 1 perform the same function as those of FIG. 1. This ball guide mechanism consists generally of a rail 30 and a slide section 27. The slide section 27 which is driven by an unillustrated power source along the fixed rail 30 is caused to displace by the sliding movement of a ball bearing containing magnetic balls 16. FIG. 6 is a sectional view of the ball guide mechanism as viewed in the direction of arrows VI—VI.

The rail 30 has a configuration resembling a railway rail and serves as a guide for the slide section 27. In the upper side edges of the rail 30 are formed arcuate ball grooves 28 in which the magnetic balls 16 are engaged.

The slide section 27 is provided on the rail 30 such that it gets astride on the rail 30 through the magnetic balls 16 and causes the magnetic balls 16 to displace linearly in the direction of an arrow R or L as bearing balls. The slide section 27 includes a couple of casings 25. Arcuate ball grooves are formed in the slide section 27 such that a part of each magnetic ball 16 is engaged therein in correspondnece to the ball grooves 28 of the rail 30. The magnetic balls 16 are rotatably and displaceably received in close contact with each adjacent ball in the ball grooves 28 of the rail 30 and the ball grooves of the slide section 27. One end and the other end of the ball grooves of the slide section 27 are opened and ends of a casing pipe 29 are connected to the opening portion of the ball grooves of the slide section 27 so that the magnetic balls 16 can be displaced.

The casing pipes 29 are pipes of gernerally oval configuration provided on both sides on the lower portions of the slide section 27. The inner diameter of each casing pipe 29 is approximately the same as the radius of the magnetic ball 16. The casing pipes 29 are made of non-magnetic substance. One end and the other end of the casing pipes 29 are connected to opening portions of one end and the other end of the ball grooves formed in the slide section 27 and the magnetic balls 16 are received rotatably and displaceably therein in close contact with each adjacent ball. Thus, the casing pipes 29 constitute endless casings 25 for receiving the magnetic balls 16 together with the ball receiving portion in the slide section 27. Each of the casing pipes 29 is provided at a predetermined portion thereof with primary coils 1A-1D and the secondary coils 2A-2D of the above described coil section 10. The magnetic balls 16 circulate within the casings 26 in accordance with displacement of the slide section 27.

If, for example, the slide section 27 displaces by a distance p in the direction of arrow R, the magnetic balls 16 of the diameter p are all caused to displace by distance of one magnetic ball 16 in the direction of the arrow R in the casing 25. Accordingly, in a portion in the coil section 10 in which the primary and secondary coils are provided, the magnetic balls 16 in the casing pipes 29 displace by the distance of one ball. In this manner, the above described position detection is achieved by the primary coils 1A-1D and the secondary coils 2A-2D and the magentic balls 16 which displace within the primary coils 1A-1D and the secondary coils 2A-2D.

In the above described embodiments, description has been made on the assumption that the rail 30 is a straight one. The rail 30 however need not be a straight one but it may a bent rail. Thus, the present invention is applicable also to a bent linear guide.

In the above described embodiments, description has been made on the assumption that a part of the casings 15 and 25 is of a tubular configuration. The casings however need not be of a tubular configuration but casings of other suitable configuration may be used if they are receiving mechanisms of an endless structure in which the magnetic balls can circulate.

In the above described embodiments, the primary coils and secondary coils are formed in a cylindrical form and attached on the outer periphery of the casing pipes 18 and 29. These coils however need not be of a cylindrical configuration but they may be of other configurations including, for example, flat coils.

The number of phases of a reference signal exciting the primary coils and the manner of connecting the secondary coils are not limited to these embodiments but various modifications can be made.

Means for obtaining the phase difference between the secondary coil output signal Y and the reference signal (sin ωt or cos ωt) may be constructed in a suitable manner. For example, by a circuit shown in FIG. 7, the phase difference $\phi$ may be obtained in a digital amount by counting time difference for a predetermined phase angle (e.g., 0 degree) between the reference signal sin ωt and the output signal $Y = K \sin(\omega t + \phi)$. The phase difference $\phi$ may be obtained also in an analog amount by integrating time difference of the predetermined phase angle.

Figure 7:
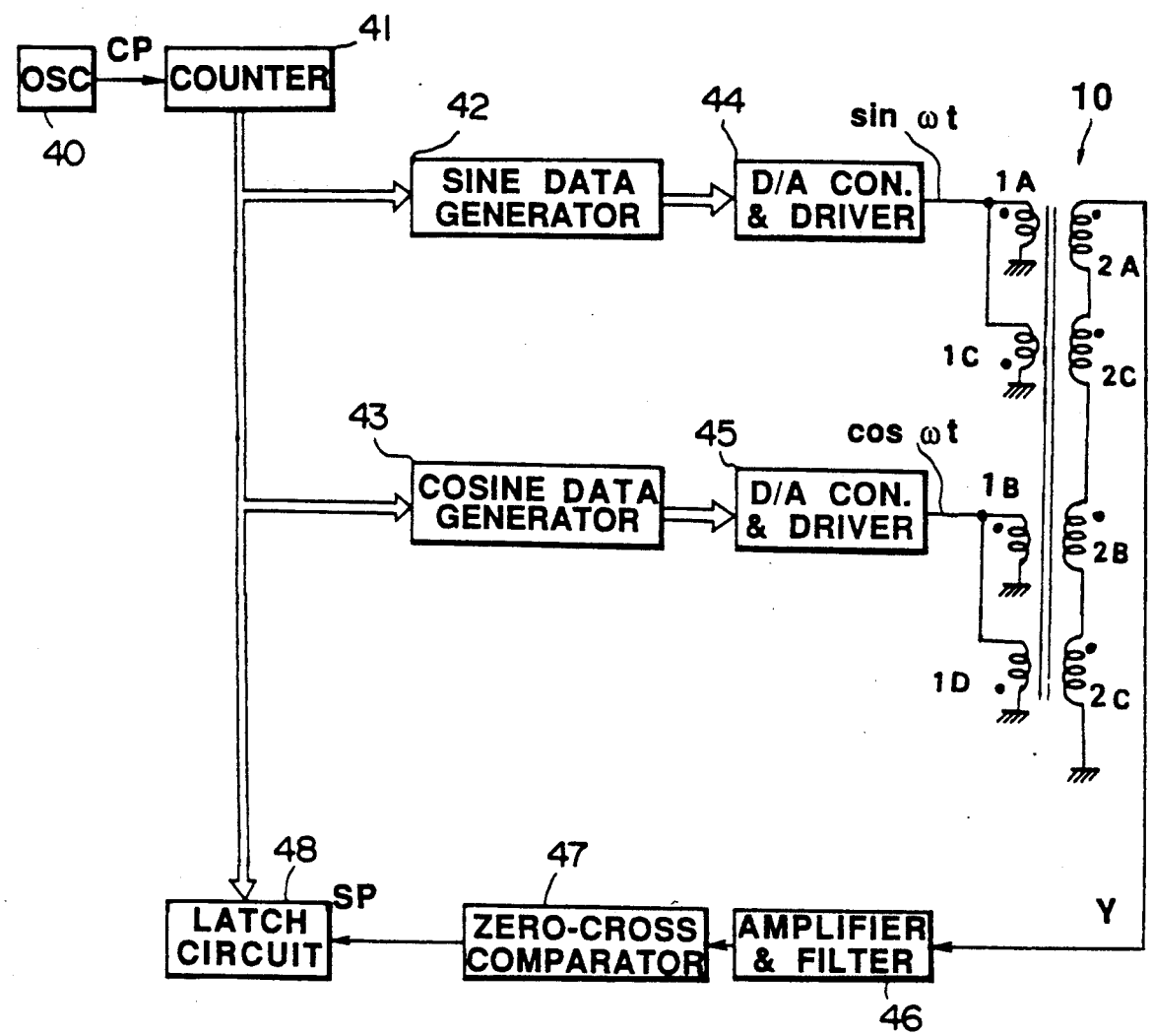
FIG. 7 is a block diagram showing an example of an electric circuit portion of the position detection device according to the invention.

In FIG. 7, a master clock pulse CP of a predetermined frequency is oscillated by an oscillator 40 and is applied to a counter 41 to be counted thereby. The output of the counter 41 is applied to a sine data generator 42 and a cosine data generator 43 which generate respectively data of sine and cosine functions. The data of sine and cosine functions are respectively applied to digital-to-analog conversion and driving circuit 44 and 45 for generation of an analog sine signal sin ωt and an analog cosine signal cos ωt. The sine signal sin ωt and cosine signal cos ωt are applied respectively to the primary coils 1A and 1B of the coil assembly 10, and the signals sin ωt and cos ωt are applied respectively to the primary coils 1C and 1D of the coil assembly 10 at the opposite phase with respect to the coils 1A and 1B. The output signal Y of the position sensor 11 is applied to a zero-crossing comparator 47 through an amplifier and filter 46 for detection of a zero-crossing phase, i.e., phase angle O. A signal which is generated in synchronism with the detection timing of this phase angle O of the output signal Y is applied as the sampling pulse SP to a latch control input of a latch circuit 48. The output count of the counter 41 is latched by the latch circuit 48 in response to this sampling pulse SP. In this manner, measured data Lx of the phase difference φ corresponding to the current position of the object of detection is latched by the latch circuit 48.

In the above described embodiments, the primary coils and the secondary coils corresponding to the primary coils are operated in four phases (constructed of two phases of sine phase or cosine phase). Alternatively, these coils may be operated in other suitable number of phases such as a two phase type of sine phase and cosine phase), a three phase type using three phases which are different by 120 degrees from one anothr and a six phase type.

The detection system is not limited to the phase detection system but the primary ac signal may be made a single phase and the position may be detected by an analog voltage level.

The material of the balls 16 of the ball bearing section need not be magnetic substance but it may be a conductive material. In that case, the amount of eddy current generated in the conductive body changes in accordance with the linear displacement and reluctance changes by eddy current loss of this eddy current whereby, in the same manner as in the above described embodiments, an output signal can be obtained in accordance with the linear displacement of the linear guide.

The coil section may consist of primary coils only and impedance change in these primary coils in accordance with the reluctance change may be measured.

As described above, according to the present invention, bearing balls of magnetic or conductive substance are disposed in an endless ball array in a linear guide mechanism such as a ball screw or a ball guide and these balls are caused to displace in accordance with displacement of the slide section so that the position of the slide section can be detected by detecting the amount of displacement of these balls. A core section used exclusively for detecting the position need therefore not be provided on the outside of the slide section in parallel thereto whereby simplification of structure of the device and compact design and low manufacturing cost can be readily realized.

What is claimed is:

1. A position detection device for a linear guide, comprising:
    a linear guide including a linear guide member, a movable member being displaceable relative to said linear guide member and a ball bearing assembly provided on said movable member in a portion which comes in sliding contact with said linear guide member, said ball bearing assembly having a casing and a succession of plural metallic balls disposed within the casing to form an endless ball array with each adjacent one of said balls being in close contact with each other and said balls being rotatable and continuously displaceable in a closed loop in accordance with the relative displacement of said movable member; and
    a coil assembly provided on a part of said casing and including a coil member to be excited by an AC signal so that a magnetic path is formed through said ball located at said part of said casing and a reluctance change is produced in the magnetic path in accordance with displacement of said balls, one cycle of said reluctance change being determined by displacement corresponding to the diameter of said balls, and said coil assembly producing an output signal responsive to said reluctance change.

2. A position detection device as defined in claim 1 wherein said part of said casing is projecting so as to facilitate attachment of said coil section.

3. A position detection device as defined in claim 1 wherein said balls are made of a magnetic substance.

4. A position detection device as defined in claim 1 wherein said balls are made of a conductive material.

5. A position detection device as defined in claim 1 wherein said coil assembly comprises a plurality of primary coils and a plurality of secondary coils corresponding thereto, said primary coils being excited by AC signals which are different in phase with one another thereby to cause said output signal obtained by phase-shifting these AC signals by an electrical phase angle corresponding to the displacement of said balls to be produced on the basis of outputs of said secondary coils.

6. A position detection device as defined in claim 5 further comprising phase difference measuring means for measuring electrical phase difference between said output signal and one of said AC signals.

7. A position detection device as defined in claim 1 wherein said coil assembly comprises primary coils and secondary coils, said primary coils being excited by AC signals thereby to cause said output signal having an amplitude level corresponding to the displacement of said balls to be produced on the basis of output signals of said secondary coils.

* * * * *